(12) United States Patent
Chan et al.

(10) Patent No.: US 11,889,588 B2
(45) Date of Patent: *Jan. 30, 2024

(54) SYSTEMS AND METHODS FOR RECEIVING INDICATIONS OF NETWORK ACCESS TECHNOLOGIES, NETWORK SERVICES, AND NETWORK CAPABILITIES BY A USER DEVICE

(71) Applicant: Verizon Patent and Licensing Inc., Basking Ridge, NJ (US)

(72) Inventors: Yee Sin Chan, San Jose, CA (US); Xin Wang, Morris Plains, NJ (US); Hui Zhao, Marlboro, NJ (US); Lily Zhu, Parsippany, NJ (US); Gerard J. Flynn, Washington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,621

(22) Filed: Dec. 16, 2021

(65) Prior Publication Data
US 2022/0109982 A1 Apr. 7, 2022

Related U.S. Application Data

(63) Continuation of application No. 16/248,124, filed on Jan. 15, 2019, now Pat. No. 11,223,944.

(51) Int. Cl.
*H04W 8/24* (2009.01)
*H04W 4/40* (2018.01)
(Continued)

(52) U.S. Cl.
CPC ............. *H04W 8/245* (2013.01); *H04W 4/40* (2018.02); *H04W 4/80* (2018.02); *H04W 80/08* (2013.01)

(58) Field of Classification Search
CPC ......... H04W 4/40; H04W 4/80; H04W 48/12; H04W 48/18; H04W 8/24; H04W 8/245;
(Continued)

(56) References Cited

U.S. PATENT DOCUMENTS 11,223,944 B2 * 1/2022 Chan ...................... H04W 4/80
2004/0072578 A1 4/2004 Keutmann et al.
(Continued)

OTHER PUBLICATIONS

"Considerations on 5G icons", 3GPP TSG-RAN #81, Gold Coast, QLD, Australia, Sep. 10-13, 2018, 3 pages.

*Primary Examiner* — Derrick V Rose

(57) ABSTRACT

A user device provides, to a network, information associated with the user device, and receives, from the network, a multi-bit network indication that indicates access technologies, services, and network capabilities provided by the network. The user device determines whether the user device is in a home network or a visited network based on the multi-bit network indication. The user device passes bits of the multi-bit network indication to an upper layer when the user device is in the home network or passes a portion of the bits of the multi-bit network indication to the upper layer when the user device is in the visited network. The user device receives a selection of one of the access technologies, the services, or the network capabilities, and receives, from the network, the one of the access technologies, the services, or the network capabilities for the user device based on the selection.

20 Claims, 9 Drawing Sheets

(51) Int. Cl.
*H04W 4/80* (2018.01)
*H04W 80/08* (2009.01)

(58) Field of Classification Search
CPC ......... H04W 80/08; H04W 8/25; H04W 4/10; H04W 80/80
See application file for complete search history.

(56) References Cited

U.S. PATENT DOCUMENTS

| | | |
|---|---|---|
| 2019/0053136 A1 | 2/2019 | Lee et al. |
| 2019/0116551 A1 | 4/2019 | Faccin et al. |
| 2020/0037387 A1* | 1/2020 | Lee .................. H04W 36/0069 |

* cited by examiner

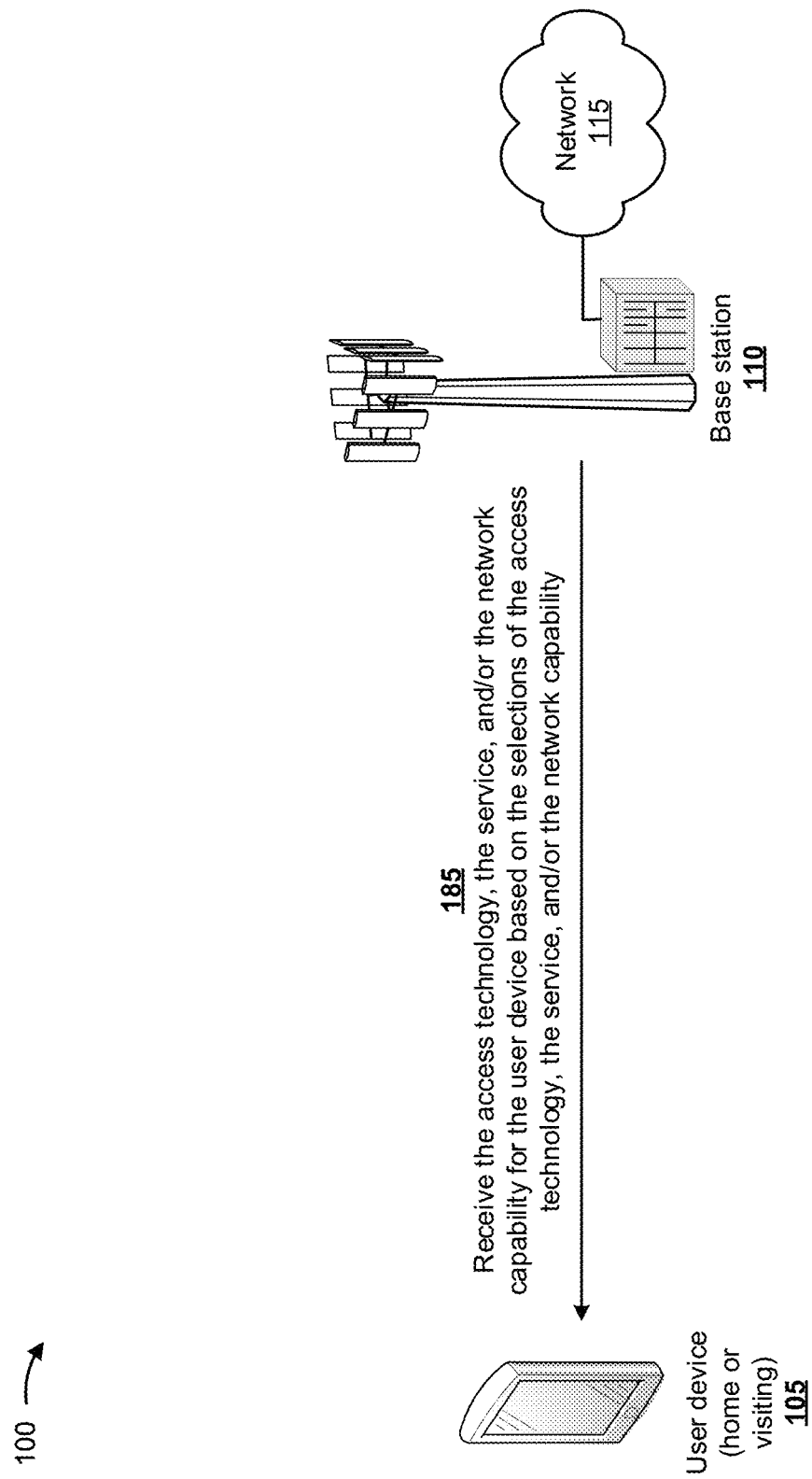

SYSTEMS AND METHODS FOR RECEIVING INDICATIONS OF NETWORK ACCESS TECHNOLOGIES, NETWORK SERVICES, AND NETWORK CAPABILITIES BY A USER DEVICE

RELATED APPLICATION

This application is a continuation of U.S. patent application Ser. No. 16/248,124, entitled "SYSTEMS AND METHODS FOR RECEIVING INDICATIONS OF NETWORK ACCESS TECHNOLOGIES, NETWORK SERVICES, AND NETWORK CAPABILITIES BY A USER DEVICE," filed Jan. 15, 2019, which is incorporated herein by reference in its entirety.

BACKGROUND

A user device (e.g., user equipment or UE) may utilize a network (e.g., a cellular network) based on selecting information identifying the network. For example, the user device may have access to different networks, such as a third generation (3G) network, a fourth generation (4G) or long-term evolution (LTE) network, a fifth generation (5G) network, and/or the like. The different networks may provide, to the user device, information indicating the availabilities of the different networks. A user of the user device may utilize the user device to select information associated with one of the different networks, and the user device may utilize the one of the different networks based on selecting the information associated with the one of the different networks.

BRIEF DESCRIPTION OF THE DRAWINGS

FIGS. 1A-1F are diagrams of an example implementation described herein.

DETAILED DESCRIPTION OF PREFERRED EMBODIMENTS

Figure 1A:
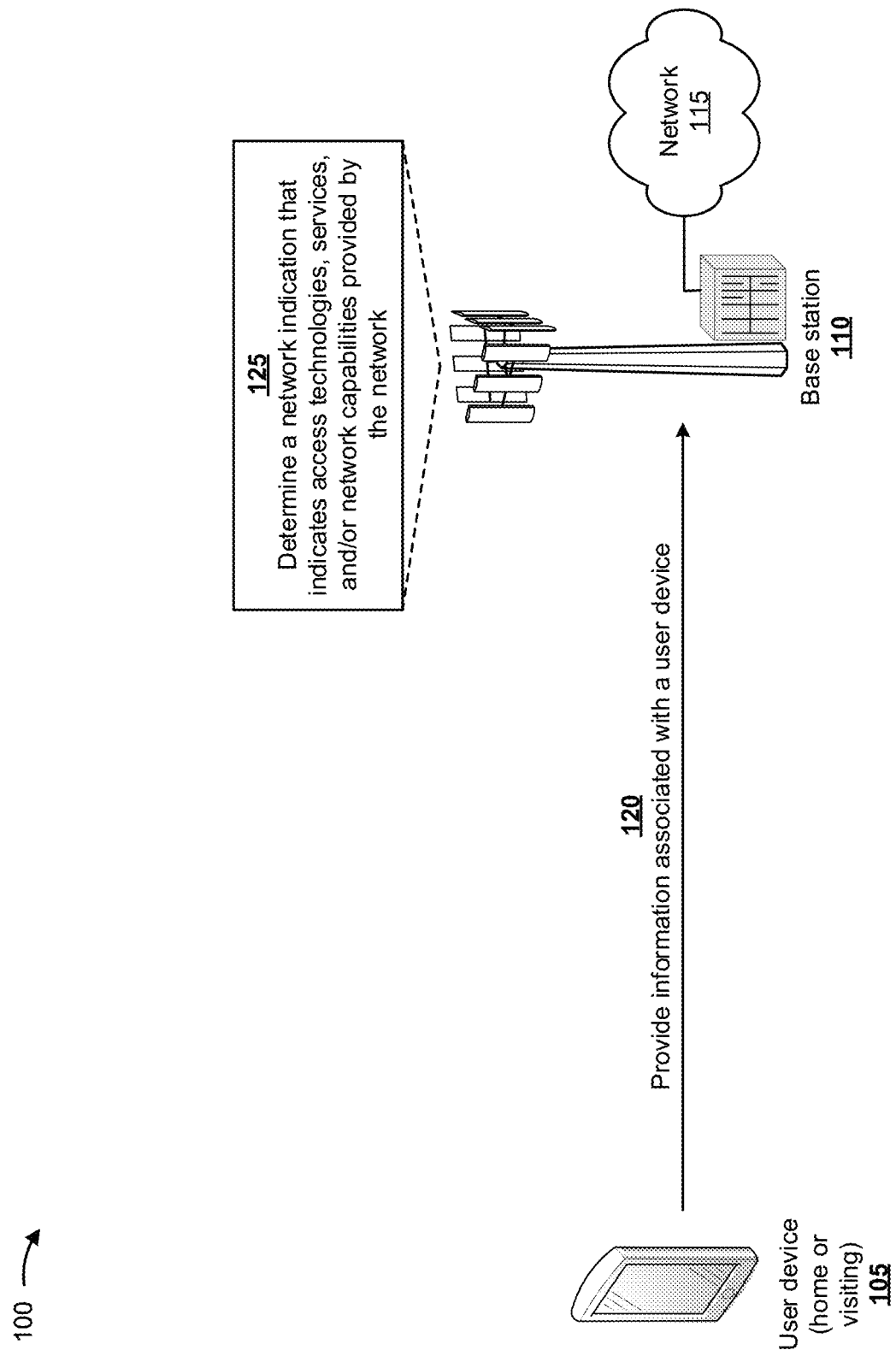

The following detailed description of example implementations refers to the accompanying drawings. The same reference numbers in different drawings may identify the same or similar elements.

A user of a user device may utilize a 5G network based on selecting information identifying the 5G network. The 5G network may include various access technologies (e.g., 5G LTE, 5G new radio (NR) frequency range 1 (FR1), 5G NR FR2, enhanced machine-type communication (eMTC), narrowband Internet of Things (NB-IoT), and/or the like), various services (e.g., a 5G gigabyte network, a 5G low latency network, and/or the like), and various network capabilities (e.g., infrastructure as a service (IaaS), platform as a service (PaaS), network as a service (NaaS), an industrial IoT-enabled platform, a general purpose enhanced mobile broadband (eMBB) infrastructure, a vehicle-to-everything (V2X) network, and/or the like). However, the 5G network does not provide information indicating the various access technologies, services, and network capabilities to the user device. Thus, the user device and/or the user of the user device (e.g., via an application) is unable to select one or more of the various access technologies, services, and network capabilities available from the 5G network.

Some implementations described herein provide a user device that receives indications of network access technologies, network services, and network capabilities. For example, a user device associated with a network may provide, to the network, information associated with the user device. The network may determine a network indication that includes an upper layer multi-bit indicator, and the upper layer multi-bit indicator may indicate access technologies, services, and network capabilities provided by the network to home network user devices and/or visited network user devices. The user device may receive the network indication from the network, and may determine whether the user device is in a home network or a visited network based on the network indication. The user device may pass all network indication bits to an upper layer (e.g., an operating system) when the user device is in the home network or may pass a portion of the network indication bits to the upper layer when the user device is in the visited network. The user device may select, or may receive from a user of the user device a selection of, one of the access technologies, the services, or the network capabilities indicated by the upper layer multi-bit indicator. The user device may receive the one of the access technologies, the services, or the network capabilities based on the selection of the one of the access technologies, the services, or the network capabilities.

In this way, the user device may receive, in addition to a universal identification of a network, information indicating various access technologies, services, and network capabilities available from the network to a user device. The user device or a user of the user device (e.g., via an application) may utilize the information to select access technologies, services, and/or network capabilities that optimize performance of the user device, which conserves resources (e.g., processing resources, memory resources, and/or the like) associated with the user device. Implementations described herein may also conserve resources of the network that would otherwise be wasted by the network providing non-optimal or excessive access technologies, services, and/or network capabilities for the user device.

FIGS. 1A-1F are diagrams of an example implementation 100 described herein. As shown in FIGS. 1A-1F, a user device 105 (e.g., in a home network or a visited network, as described below) may wish to access a base station 110 and an associated network 115. For example, with reference to FIG. 1A, a user device 105 may establish a connection (e.g., a radio resource control (RRC) connection) with base station 110 of network 115. In some implementations, base station 110 may broadcast a signal that includes a network indication, as described below in connection with FIG. 1B. In such implementations, user device 105 may receive the signal and may establish a connection with base station 110 based on receiving the signal.

As further shown in FIG. 1A, and by reference number 120, user device 105 may provide, to base station 110, information associated with user device 105. In some implementations, the information associated with user device 105 may include information identifying user device 105 (e.g., a mobile device identifier (ID), such as a unique device ID, a telephone number, a serial number, and/or the like), information indicating capabilities of user device 105 (e.g., a 4G device, a 5G device, and/or the like), information indicating a home network of user device 105 (e.g., a "home network"

refers to a network with which user device 105 is registered, and a "visited network" refers to a network to which user device 105 temporarily roams and which is outside the bounds of the home network), and/or the like.

As further shown in FIG. 1A, and by reference number 125, base station 110 may determine a network indication that indicates access technologies, services, and/or network capabilities provided by network 115. In some implementations, the network indication may include an upper layer multi-bit indicator that includes a multi-bit information element. In some implementations, the multi-bit information element may be different than a one-bit upper layer indication that provides a universal identification (e.g., a 5G network) of network 115.

In some implementations, the access technologies provided by network 115 may include 4G, 4G LTE, 5G LTE, 5G NR FR1, 5G NR FR2, eMTC, NB-IoT, and/or the like. In some implementations, the services provided by network 115 may include a 5G gigabyte network, a 5G low latency network, and/or the like. In some implementations, the network capabilities provided by network 115 may include IaaS, PaaS, NaaS, an industrial IoT-enabled platform, a general purpose eMBB infrastructure, a vehicle-to-everything (V2X) network, and/or the like. In some implementations, each bit in the network indication (e.g., the multi-bit information element) may provide an indication of a corresponding one of the access technologies, the services, and/or the network capabilities provided by network 115. For example, the network indication may include three bits, where "000" may indicate 4G, "001" may indicate 4G LTE, "010" may indicate 4G V2X, "011" may indicate 4G ultra-reliable low latency (URLL), "100" may indicate 5G LTE, "101" may indicate 5G gigabyte, "110" may indicate 5G low latency, "111" may indicate V2X, and/or the like.

Figure 1B:
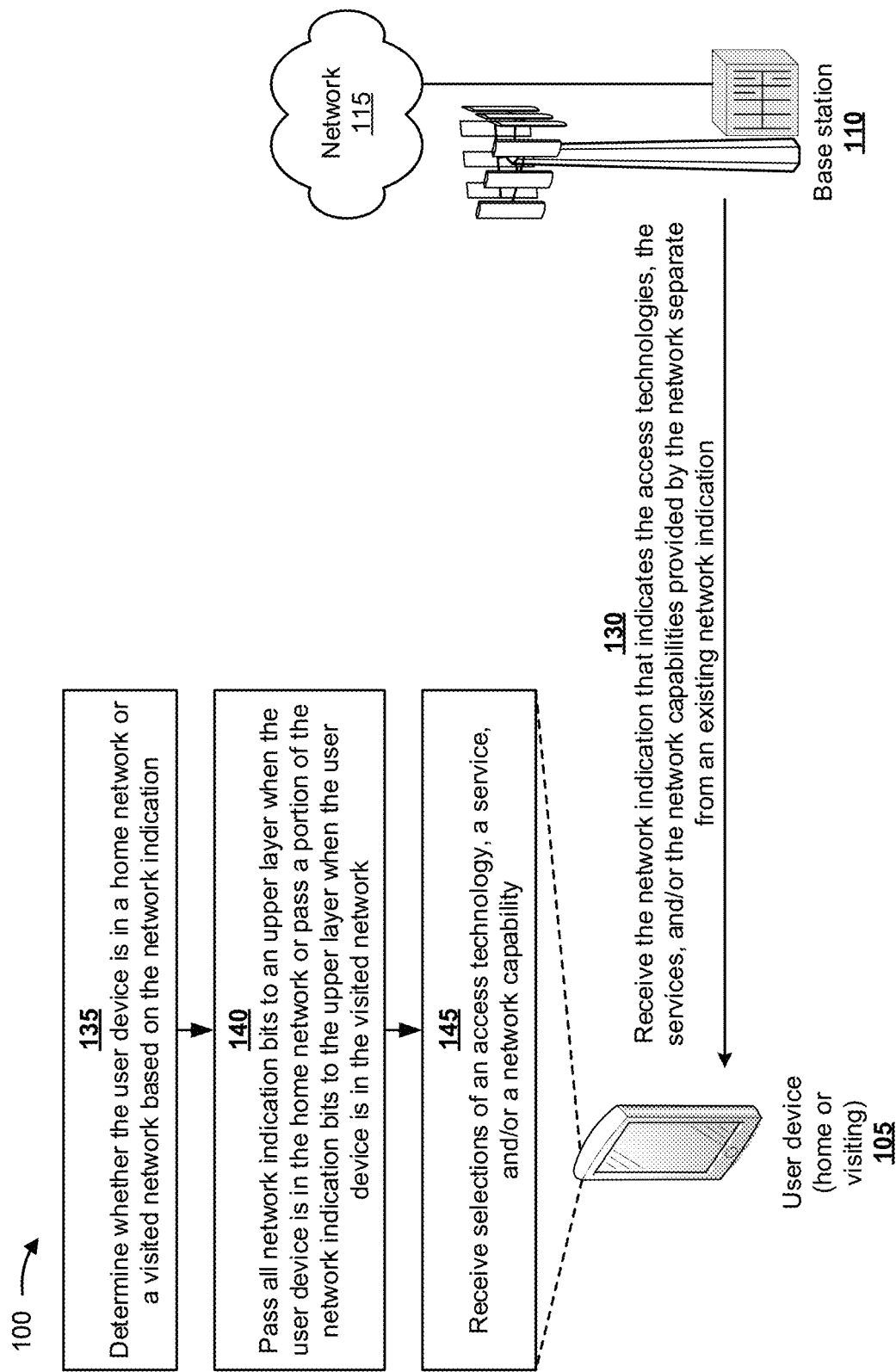

As shown in FIG. 1B, and by reference number 130, user device 105 may receive, from base station 110, the network indication that indicates the access technologies, the services, and/or the network capabilities provided by network 115 separate from an existing network indication (e.g., a one-bit upper layer indication that provides a universal identification of network 115). In some implementations, base station 110 may broadcast the network indication in a signal that may be received by multiple user devices 105 and understood by user devices 105 for which network 115 is a home network or a visited network.

As further shown in FIG. 1B, and by reference number 135, user device 105 may determine whether user device 105 is in a home network or a visited network based on the network indication. In some implementations, the network indication may include information identifying network 115 and user device 105 may determine, based on the information identifying network 115, whether network 115 is a home network for user device 105 or a visited network for user device 105.

As further shown in FIG. 1B, and by reference number 140, user device 105 may pass all bits of the network indication to an upper layer (e.g., an operating system of user device 105) when network 115 is the home network for user device 105 or may pass a portion of the bits of the network indication to the upper layer when network 115 is the visited network for user device 105. For example, if the network indication includes three bits, as described above, user device 105 may provide all three bits to the upper layer of user device 105 when network 115 is the home network for user device 105. Alternatively, user device 105 may provide one bit (e.g., a first bit), of the three bits, to the upper layer of user device 105 when network 115 is the visited network for user device 105.

As further shown in FIG. 1B, and by reference number 145, user device 105 may receive selections of an access technology, a service, and/or a network capability based on the bits of the network indication passed to the upper layer. In some implementations, user device 105 may automatically select at least one of an access technology, a service, and/or a network capability based on capabilities of user device 105. In some implementations, user device 105 may receive the network indication that indicates the access technologies, the services, and/or the network capabilities provided by network 115, and may provide for display (e.g., via a user interface) information indicating the access technologies, the services, and/or the network capabilities provided by network 115. For example, the user interface may include information identifying the access technologies (e.g., "5G LTE, 5G NR FR1, 5G NR FR2, eMTC, NB-IoT, etc."), the services (e.g., "5G gigabyte networks, 5G low latency networks, etc."), and/or the network capabilities (e.g., "IaaS, PaaS, NaaS, an industrial IoT-enabled platform, a general purpose eMBB infrastructure, a V2X network, etc.") provided by network 115. In some implementations, user device 105 may provide for display (e.g., via the user interface) information indicating the access technologies, the services, and/or the network capabilities supported by user device 105. For example, if user device 105 can only support 5G LTE, a 5G low latency network, and PaaS, then user device 105 may display information indicating the 5G LTE, the 5G low latency network, and the PaaS.

In some implementations, user device 105 may select one or more of the access technologies, the services, and/or the network capabilities provided via the user interface. In some implementations, user device 105 may automatically select one or more of the access technologies, the services, and/or the network capabilities to optimize performance of user device 105 and/or based on input from the user of user device 105. For example, user device 105 may automatically select one or more of the access technologies, the services, and/or the network capabilities based on the user planning to use user device 105 while traveling, watching a video, current usage of user device 105, and/or the like. In some implementations, user device 105 may provide one or more recommendations of the access technologies, the services, and/or the network capabilities to the user (e.g., select option A if your planned use matches situation 1, select option B if your planned use matches situation 2, we recommend option A, and/or the like).

Figure 1C:
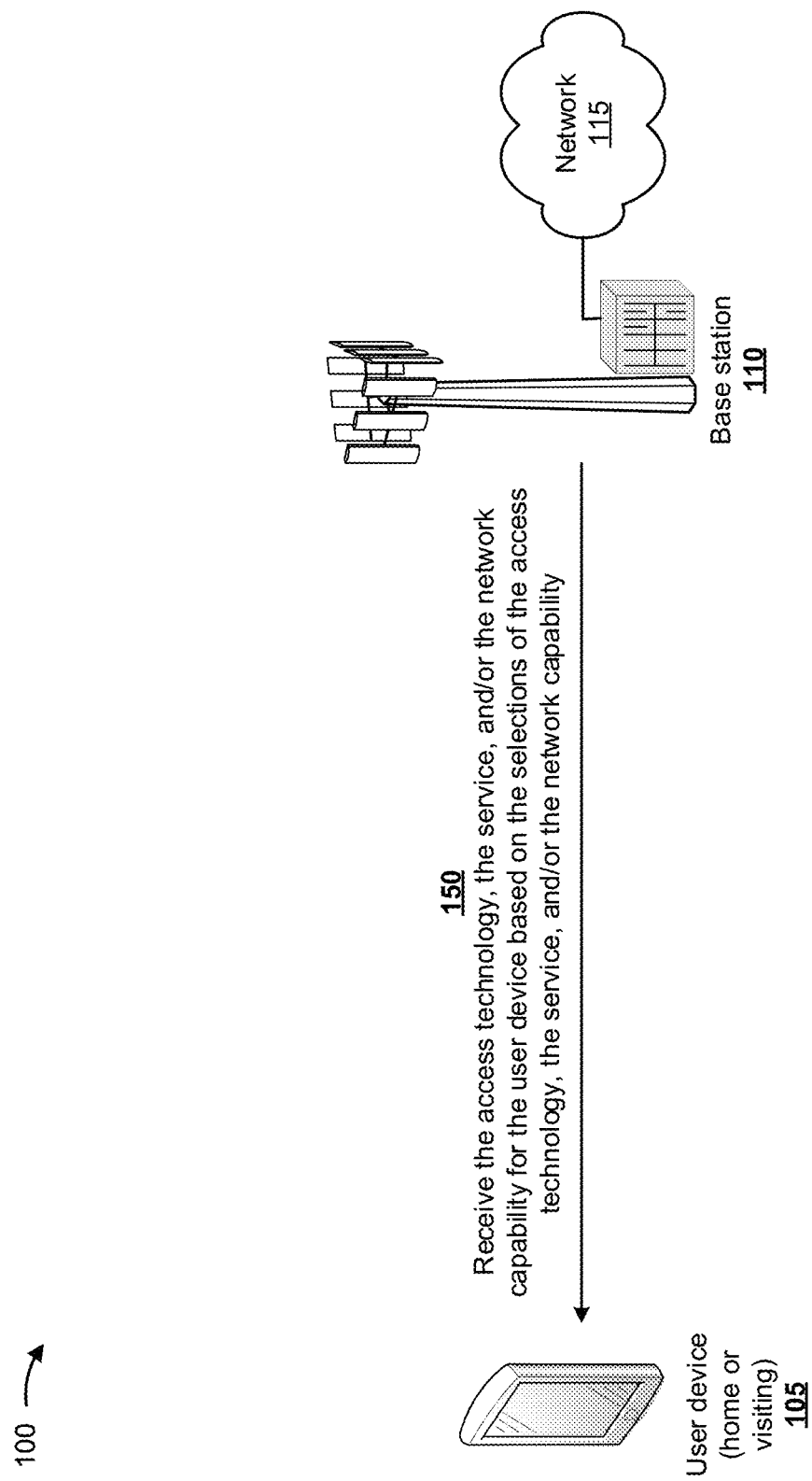

As shown in FIG. 1C, and by reference number 150, user device 105 may receive, from base station 110, the access technology, the service, and/or the network capability for user device 105 based on the selections of the access technology, the service, and/or the network capability. In some implementations, base station 110 may provide user device 105 with access to the access technology, the service, and/or the network capability selected by user device 105 or by the user of user device 105. For example, if user device 105 or the user selects the 5G LTE access technology, the 5G Gigabyte network service, and the IaaS network capability, base station 110 may provide user device 105 with access to the 5G LTE access technology, the 5G Gigabyte network service, and the IaaS network capability provided by network 115. In some implementations, base station 110 may provide, to a network management device, information indicating the selections, and the network management device may cause certain network devices in network 115

(e.g., including base station 110) to be configured in a certain way (e.g., to provide the access technology, the service, and/or the network capability for user device 105) or to handle traffic associated with user device 105 in a certain way (e.g., to provide the access technology, the service, and/or the network capability for user device 105).

Figure 1D:
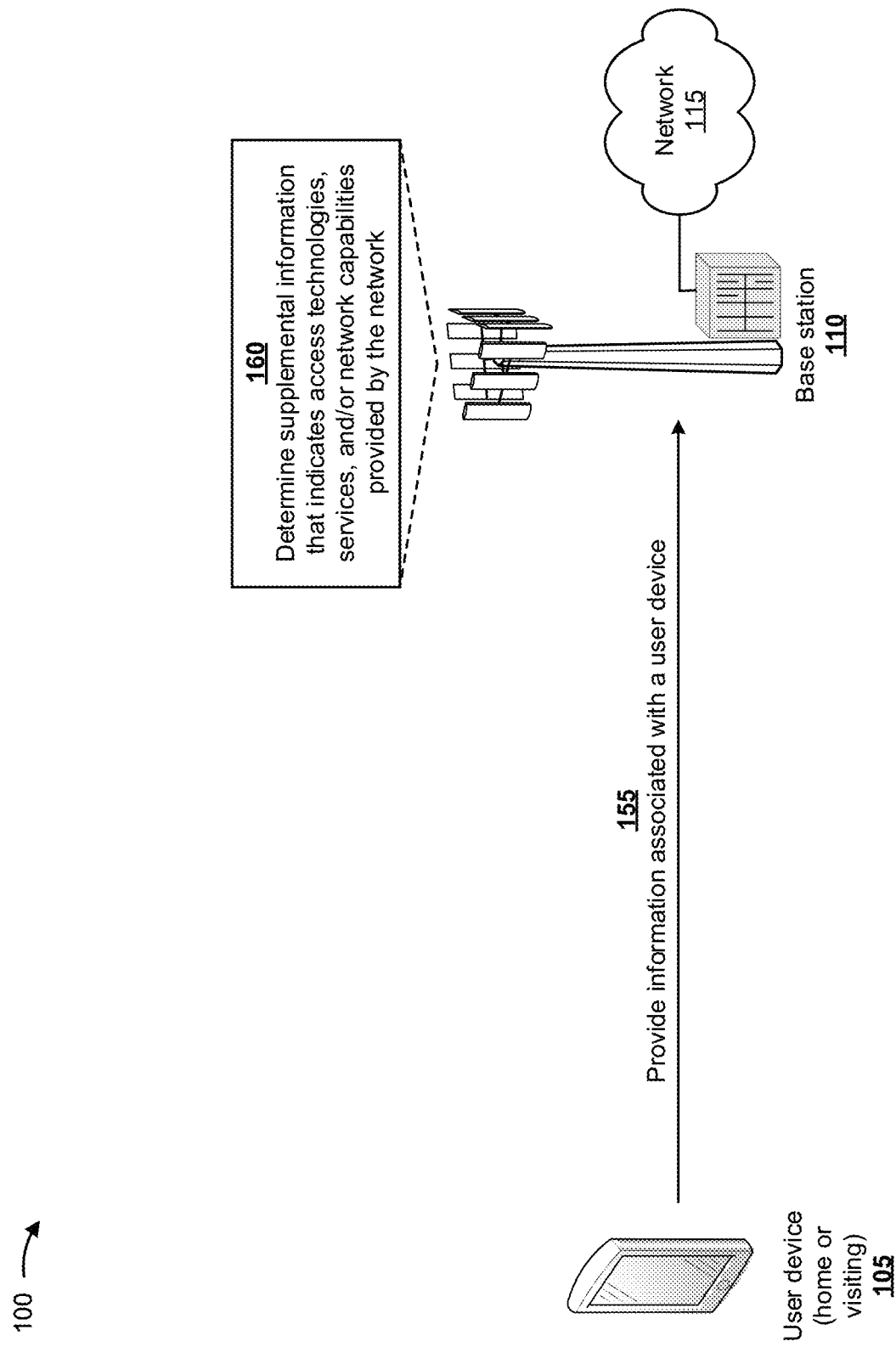

As shown in FIG. 1D, a user device 105 for a home or a visited network may establish a connection (e.g., an RRC connection) with base station 110 of network 115. In some implementations, base station 110 may broadcast a signal that includes an existing network indication (e.g., an existing upper layer indication that provides a universal identification of network 115) with supplemental information (e.g., that indicates access technologies, services, and/or network capabilities provided by network 115), as described below in connection with FIG. 1E. In such implementations, user device 105 may receive the signal and may establish a connection with base station 110 based on receiving the signal.

As further shown in FIG. 1D, and by reference number 155, user device 105 may provide, to base station 110, information associated with user device 105. In some implementations, the information associated with user device 105 may include information identifying user device 105 (e.g., a mobile device ID, such as a unique device ID, a telephone number, a serial number, and/or the like), information indicating capabilities of user device 105 (e.g., a 4G device, a 5G device, and/or the like), information indicating a home network of user device 105, and/or the like.

As further shown in FIG. 1D, and by reference number 160, base station 110 may determine the supplemental information that indicates access technologies, services, and/or network capabilities provided by network 115. In some implementations, the supplemental information may include an upper layer multi-bit indicator that includes a multi-bit upper layer indication information element. In some implementations, the supplemental information may be added to an existing upper layer indication that provides a universal identification (e.g., a 5G network) of network 115.

In some implementations, the access technologies, the services, and the network capabilities provided by network 115 may include the access technologies, the services, and the network capabilities described above in connection with FIG. 1A. In some implementations, each bit in the supplemental information (e.g., the multi-bit upper layer indication information element) may provide an indication of a corresponding one of the access technologies, the services, and the network capabilities provided by network 115. For example, the supplemental information may include three bits, where "000" may indicate 4G, "001" may indicate 4G LTE, "010" may indicate 4G V2X, "011" may indicate 4G ultra-reliable low latency (URLL), "100" may indicate 5G LTE, "101" may indicate 5G gigabyte, "110" may indicate 5G low latency, "111" may indicate V2X, and/or the like.

Figure 1E:
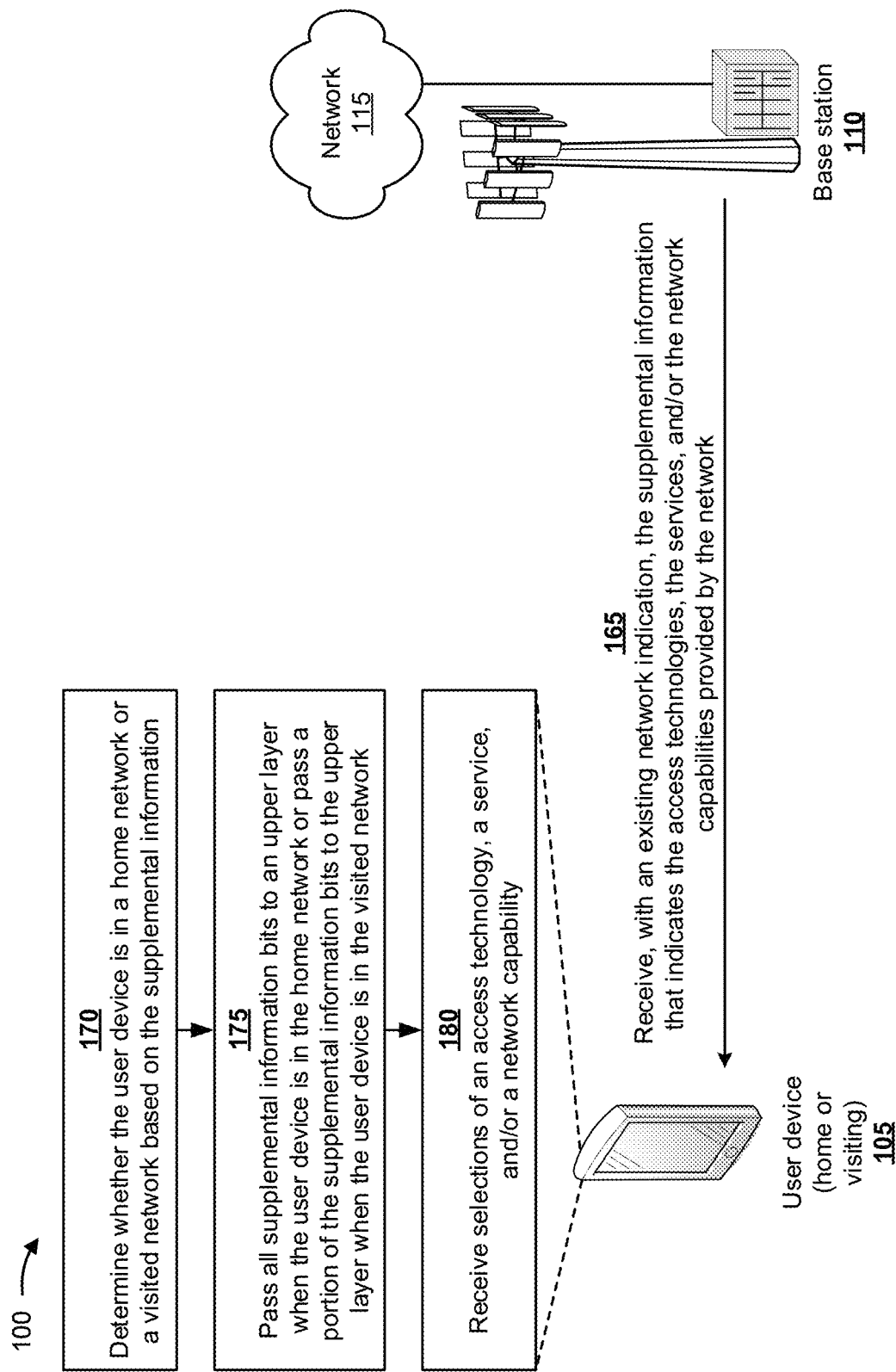

As shown in FIG. 1E, and by reference number 165, user device 105 may receive, from base station 110 and with an existing network indication (e.g., the existing upper layer indication that provides a universal identification), the supplemental information that indicates the access technologies, the services, and/or the network capabilities provided by network 115. In some implementations, base station 110 may broadcast the existing network indication with the supplemental information in a signal that may be received by multiple user devices 105 and understood by user devices 105 for which network 115 is a visited network or a home network.

As further shown in FIG. 1E, and by reference number 170, user device 105 may determine whether user device 105 is in a home network or a visited network based on the supplemental information. In some implementations, the supplemental information or the existing network indication may include information identifying network 115 and user device 105 may determine, based on the information identifying network 115, whether network 115 is a home network for user device 105 or a visited network for user device 105.

As further shown in FIG. 1E, and by reference number 175, user device 105 may pass all bits of the supplemental information to an upper layer (e.g., an operating system of user device 105) when network 115 is the home network for user device 105 or may pass a portion of the bits of the supplemental information to the upper layer when network 115 is the visited network for user device 105. For example, if the supplemental information includes three bits, as described above, user device 105 may provide all three bits to the upper layer of user device 105 when network 115 is the home network for user device 105. Alternatively, user device 105 may provide one bit (e.g., a first bit), of the three bits, to the upper layer of user device 105 when network 115 is the visited network for user device 105.

As further shown in FIG. 1E, and by reference number 180, user device 105 may receive selections of an access technology, a service, and/or a network capability based on the bits of the supplemental information passed to the upper layer. In some implementations, user device 105 may automatically select at least one of an access technology, a service, and/or a network capability based on capabilities of user device 105. In some implementations, user device 105 may receive the supplemental information that indicates the access technologies, the services, and/or the network capabilities provided by network 115, and may provide for display (e.g., via a user interface) information indicating the access technologies, the services, and/or the network capabilities provided by network 115. For example, the user interface may include information identifying the access technologies (e.g., "5G LTE, 5G NR FR1, 5G NR FR2, eMTC, NB-IoT, etc."), the services (e.g., "5G gigabyte networks, 5G low latency networks, etc."), and/or the network capabilities (e.g., "IaaS, PaaS, NaaS, an industrial IoT-enabled platform, a general purpose eMBB infrastructure, a V2X network, etc.") provided by network 115. In some implementations, user device 105 may provide for display (e.g., via the user interface) information indicating the access technologies, the services, and/or the network capabilities supported by user device 105.

In some implementations, user device 105 may select one or more of the access technologies, the services, and/or the network capabilities provided via the user interface. In some implementations, user device 105 may automatically select one or more of the access technologies, the services, and/or the network capabilities to optimize performance of user device 105 and/or based on input from the user of user device 105. For example, user device 105 may automatically select one or more of the access technologies, the services, and/or the network capabilities based on the user planning to use user device 105 while traveling, watching a video, current usage of user device 105, and/or the like. In some implementations, user device 105 may provide one or more recommendations of the access technologies, the services, and/or the network capabilities to the user.

As shown in FIG. 1F, and by reference number 185, user device 105 may receive, from base station 110, the access technology, the service, and/or the network capability for user device 105 based on the selections of the access technology, the service, and/or the network capability. In some implementations, base station 110 may provide user device 105 with access to the access technology, the service, and/or the network capability selected by user device 105 or the user of user device 105. For example, if user device 105 or the user selects the 5G NR FR2 access technology, the 5G low latency network service, and the industrial IoT network capability, base station 110 may provide user device 105 with access to the 5G NR FR2 access technology, the 5G low latency network service, and the industrial IoT network capability provided by network 115. In some implementations, base station 110 may provide, to a network management device, information indicating the selections, and the network management device may cause certain network devices in network 115 (e.g., including base station 110) to be configured in a certain way (e.g., to provide the access technology, the service, and/or the network capability for user device 105) or to handle traffic associated with user device 105 in a certain way (e.g., to provide the access technology, the service, and/or the network capability for user device 105).

In this way, base station 110 may provide information indicating various access technologies, services, and network capabilities available from network 115 to user device 105. User device 105 may utilize the information to associate user experiences (e.g., throughputs, latency, and/or the like) with a particular technology or deployment option, may select access technologies, services, and/or network capabilities that optimize performance of the user device, and/or the like. This conserves resources (e.g., processing resources, memory resources, and/or the like) associated with the user device. Furthermore, currently there does not exist a technique that provides indications of network access technologies, network services, and network capabilities to a user device and that automatically selects one or more of the access technologies, the network services, and/or the network capabilities.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
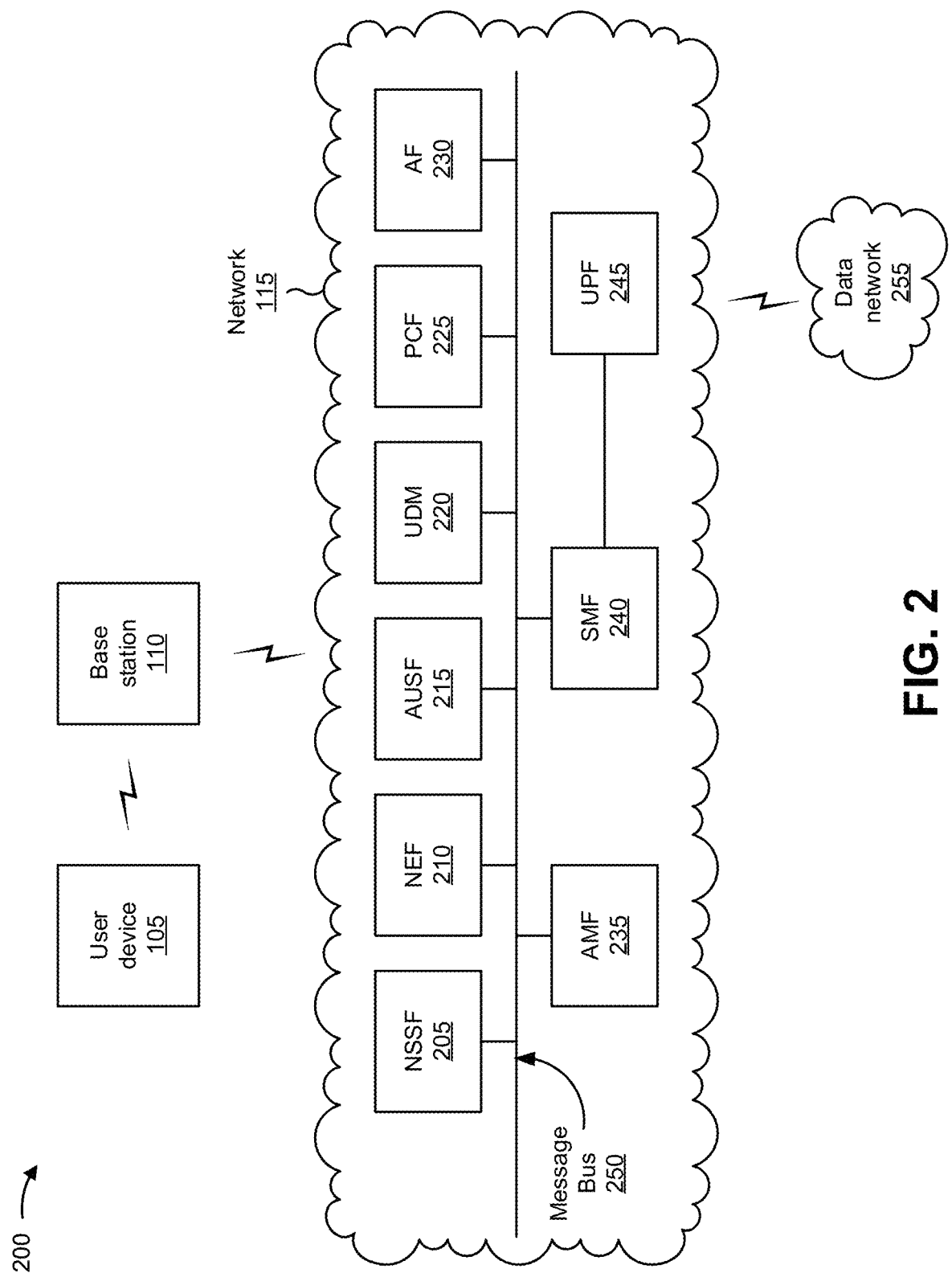
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, example environment 200 may include user device 105, base station 110, network 115, and a data network 255. Devices and/or networks of example environment 200 may interconnect via wired connections, wireless connections, or a combination of wired and wireless connections.

User device 105 includes one or more devices capable of receiving, generating, storing, processing, and/or providing information, such as information described herein. For example, user device 105 can include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, etc.), a mobile hotspot device, a fixed wireless access device, customer premises equipment, an autonomous vehicle, or a similar type of device. In some implementations, user device 105 can receive information from and/or transmit information to base station 110.

Base station 110 includes one or more devices capable of communicating with user device 105 using a cellular radio access technology (RAT). For example, base station 110 may include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 110 may transfer traffic between user device 105 (e.g., using a cellular RAT), other base stations 110 (e.g., using a wireless interface or a backhaul interface, such as a wired backhaul interface), and/or network 115. Base station 110 may provide one or more cells that cover geographic areas. Some base stations 110 may be mobile base stations. Some base stations 110 may communicate using multiple RATs.

In some implementations, base station 110 may perform scheduling and/or resource management for user devices 105 covered by base station 110 (e.g., user devices 105 covered by a cell provided by base station 110). In some implementations, base station 110 may be controlled or coordinated by a network controller, which may perform load balancing, network-level configuration, and/or the like. The network controller may communicate with base station 110 via a wireless or wireline backhaul. In some implementations, base station 110 may include a network controller, a self-organizing network (SON) module or component, or a similar module or component. In other words, base station 110 may perform network control, scheduling, and/or network management functions (e.g., for other base stations 110 and/or for uplink, downlink, and/or sidelink communications of user devices 105 covered by the base station 110). In some implementations, base station 110 may include a central unit and multiple distributed units. The central unit may coordinate access control and communication with regard to the multiple distributed units. The multiple distributed units may provide user devices 105 and/or other base stations 110 with access to data network 255 via the core network.

In some implementations, network 115 may include an example functional architecture in which systems and/or methods, described herein, may be implemented. For example, network 115 may include an example architecture of a 5G next generation (NG) core network included in a 5G wireless telecommunications system. While the example architecture of network 115 shown in FIG. 2 may be an example of a service-based architecture, in some implementations, network 115 may be implemented as a reference-point architecture.

As shown in FIG. 2, network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user device 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user devices 105 in the wireless telecommunications system.

UDM 220 includes one or more devices that store subscriber data and profiles in the wireless telecommunications system. UDM 220 may be used for fixed access, mobile access, and/or the like, in network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communications sessions in the wireless telecommunications system. For example, SMF 240 may configure traffic steering policies at UPF 245, enforce user device IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
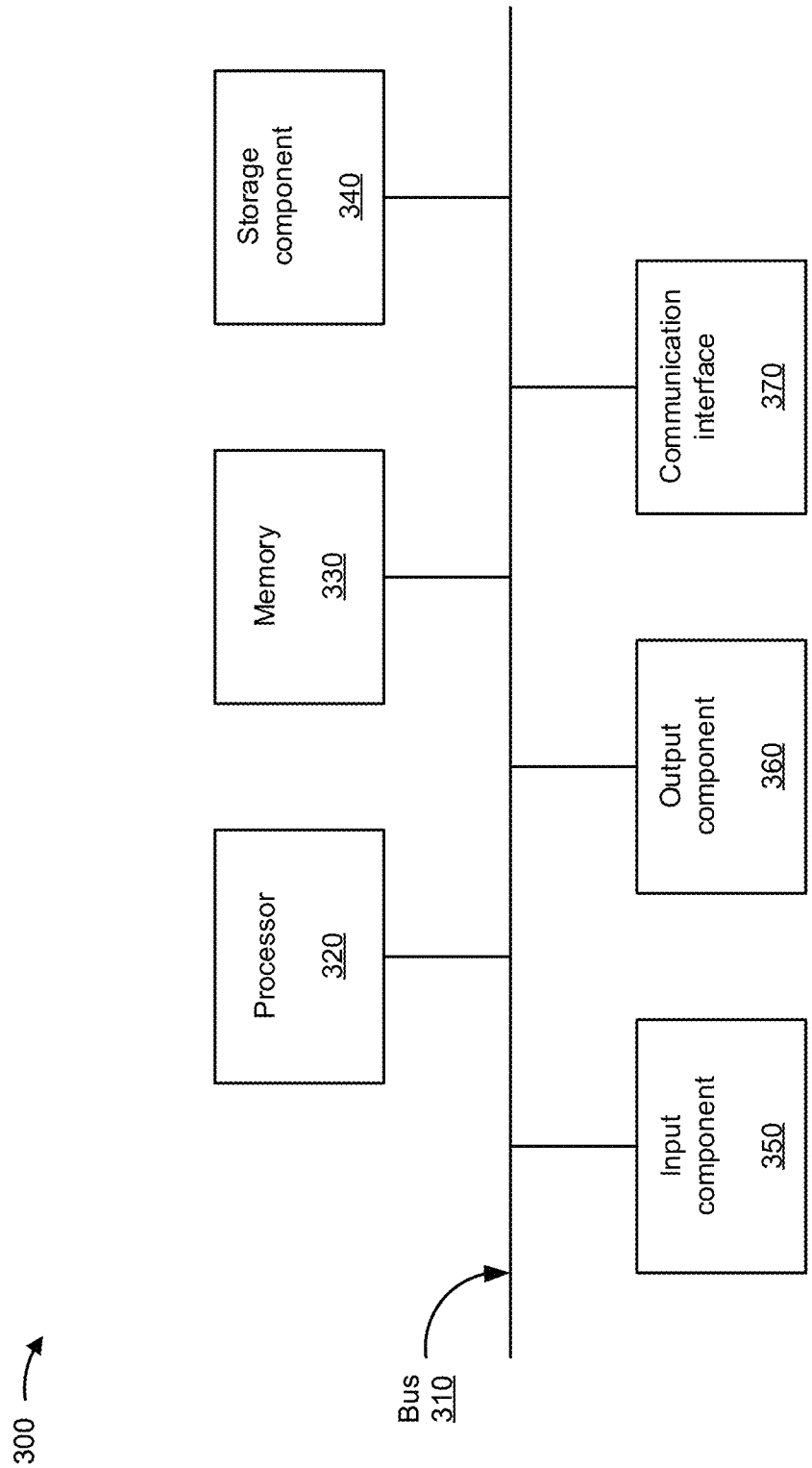
FIG. 3 is a diagram of example components of one or more devices of FIG. 2.

FIG. 3 is a diagram of example components of a device 300. Device 300 may correspond to user device 105, base station 110, NSSF 205, NEF 210, AUSF 215, UDM 220, PCF 225, AF 230, AMF 235, SMF 240, and/or UPF 245. In some implementations, user device 105, base station 110, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
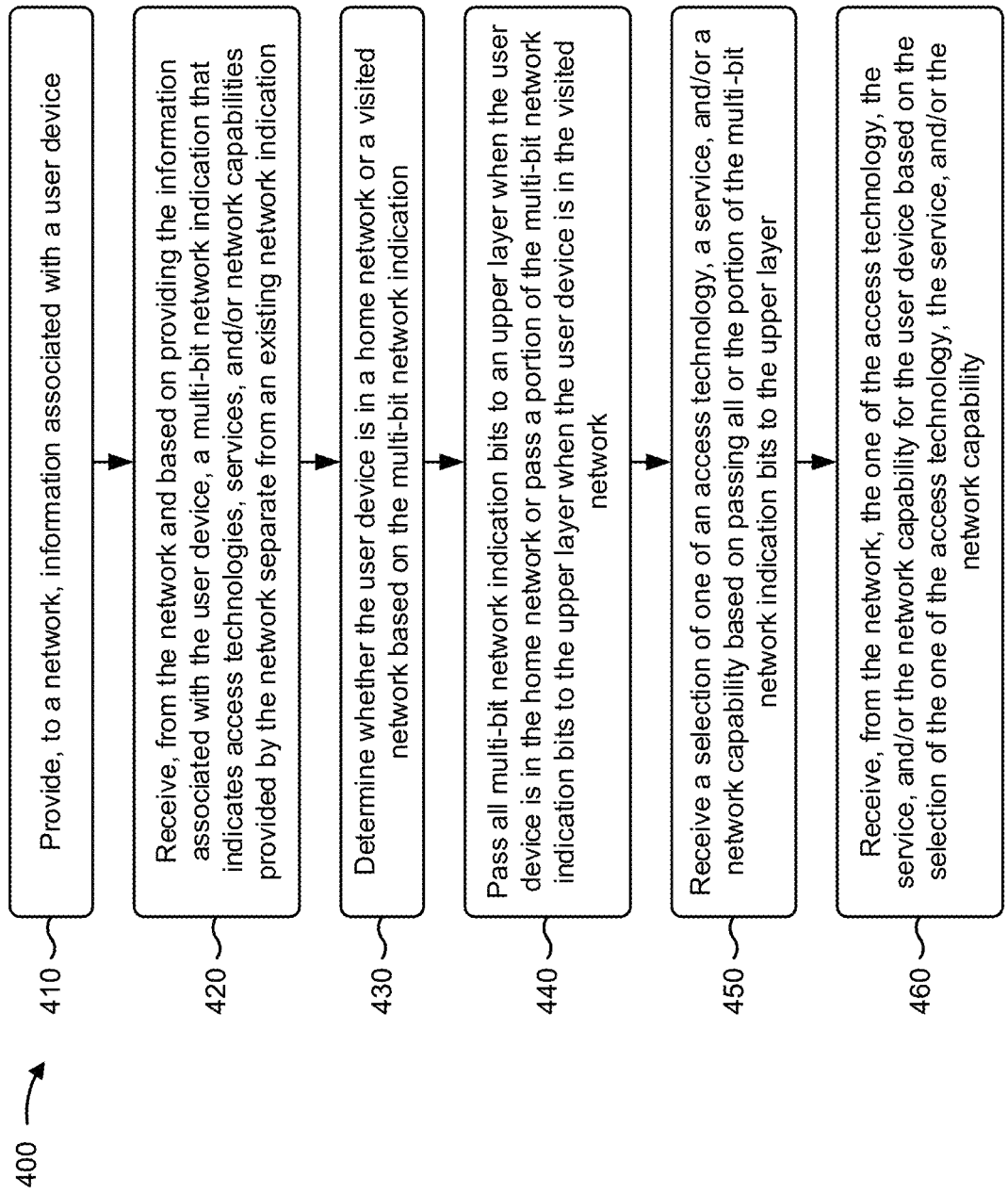
FIG. 4 is a flow chart of an example process for receiving indications of network access technologies, network services, and network capabilities by a user device.

FIG. 4 is a flow chart of an example process 400 for receiving indications of network access technologies, network services, and network capabilities by a user device. In some implementations, one or more process blocks of FIG. 4 may be performed by a device, such as a user device (e.g., user device 105). In some implementations, one or more process blocks of FIG. 4 may be performed by another device or a group of devices separate from or including the device, such as a base station (e.g., base station 110), a NSSF (e.g., NSSF 205), a SMF (e.g., SMF 240), and/or a UPF (e.g., UPF 245).

As shown in FIG. 4, process 400 may include providing, to a network, information associated with a user device (block 410). For example, the user device (e.g., using processor 320, storage component 340, communication interface 370, and/or the like) may provide, to network, information associated with a user device, as described above in connection with FIGS. 1A-2.

As further shown in FIG. 4, process 400 may include receiving, from the network and based on providing the information associated with the user device, a multi-bit network indication that indicates access technologies, services, and/or network capabilities provided by the network separate from an existing network indication (block 420). For example, the user device (e.g., using processor 320, memory 330, communication interface 370, and/or the like) may receive, from the network and based on providing the information associated with the user device, a multi-bit network indication that indicates access technologies, services, and/or network capabilities provided by the network separate from an existing network indication, as described above in connection with FIGS. 1A-2.

As further shown in FIG. 4, process 400 may include determining whether the user device is in a home network or a visited network based on the multi-bit network indication (block 430). For example, the user device (e.g., using processor 320, storage component 340, communication interface 370, and/or the like) may determine whether the user device is in a home network or a visited network based on the multi-bit network indication, as described above in connection with FIGS. 1A-2.

As further shown in FIG. 4, process 400 may include passing all multi-bit network indication bits to an upper layer when the user device is in the home network or passing a portion of the multi-bit network indication bits to the upper layer when the user device is in the visited network (block 440). For example, the user device (e.g., using processor 320, memory 330, communication interface 370, and/or the like) may pass all multi-bit network indication bits to an upper layer when the user device is in the home network or may pass a portion of the multi-bit network indication bits to the upper layer when the user device is in the visited network, as described above in connection with FIGS. 1A-2.

As further shown in FIG. 4, process 400 may include receiving a selection of one of an access technology, a service, and/or a network capability based on passing all or the portion of the multi-bit network indication bits to the upper layer (block 450). For example, the user device (e.g., using processor 320, storage component 340, communication interface 370, and/or the like) may receive a selection of one of an access technology, a service, and/or a network capability based on passing all or the portion of the multi-bit network indication bits to the upper layer, as described above in connection with FIGS. 1A-2.

As further shown in FIG. 4, process 400 may include receiving, from the network, the one of the access technology, the service, and/or the network capability for the user device based on the selection of the one of the access technology, the service, and/or the network capability (block 460). For example, the user device (e.g., using processor 320, memory 330, communication interface 370, and/or the like) may receive, from the network, the one of the access technology, the service, and/or the network capability for the user device based on the selection of the one of the access technology, the service, and/or the network capability, as described above in connection with FIGS. 1A-2.

Process 400 may include additional implementations, such as any single implementation or any combination of implementations described below and/or described with regard to any other process described herein.

In some implementations, the multi-bit network indication may be replaced with supplemental information that is included with the existing network indication (e.g., rather than separate from the existing network indication). In some implementations, the multi-bit network indication or the supplemental information may enable the user device to display information identifying the access technologies provided by the network for the user device, the services provided by the network for the user device, and/or the network capabilities provided by the network for the user device.

In some implementations, the access technologies may include a fifth generation (5G) long-term evolution (LTE) access technology, a 5G new radio (NR) frequency range 1 (FR1) access technology, a 5G NR frequency range 2 (FR2) access technology, an enhanced machine-type communication (eMTC) access technology, a narrowband Internet of Things (NB-IoT) access technology, and/or the like. In some implementations, the services may include a 5G gigabyte network, a 5G low latency network, and/or the like. In some implementations, the network capabilities may include an infrastructure as a service (IaaS), a platform as a service (PaaS), a network as a service (NaaS), an industrial IoT-enabled platform, a general purpose enhanced mobile broadband (eMBB) infrastructure, a vehicle-to-everything (V2X) network, and/or the like.

In some implementations, the existing network indication may include an upper layer indication that provides a universal identification of the network. In some implementations, the multi-bit network indication may include an upper layer multi-bit indicator with a multi-bit upper layer indication information element. In some implementations, the selection may be automatically generated by the user device or received via a user input to the user device.

In some implementations, the user device may selectively provide, for display, information associated with the bits of the multi-bit network indication or information associated with the portion of the bits of the multi-bit network indication. The information associated with the bits of the multi-bit network indication may be provided for display when the user device is in the home network, and the information associated with the portion of the bits of the multi-bit network indication may be provided for display when the user device is in the visited network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  selectively passing, by a device, bits of a multi-bit network indication to an upper layer of the device,
    wherein a first portion of the bits of the multi-bit network indication are passed to the upper layer when the device is in a first network and indicate that a first portion of access technologies, services, and network capabilities indicated by the multi-bit network indication are accessible, and
    wherein a second portion of the bits of the multi-bit network indication are passed to the upper layer when the device is in a second network and indicate that a second portion of the access technologies, services, and network capabilities indicated by the multi-bit network indication is accessible; and
  receiving, by the device via the upper layer, a selection of one of the access technologies, the services, or the network capabilities provided via a user interface of the device based on selectively passing the first portion or the second portion of the bits of the multi-bit network indication,
    wherein receiving the selection of the one of the access technologies, the services, or the network capabilities is based on receiving user input via the user interface selecting the one of the access technologies, the services, or the network capabilities for usage on the device.

2. The method of claim 1, further comprising:
  providing, for display, information indicating the first portion or the second portion of the access technologies, services, and network capabilities.

3. The method of claim 1, where the selection of the one of the access technologies is based on a performance of the device.

4. The method of claim 1, further comprising:
  providing a recommendation for the selection of the one of the access technologies based on a current usage of the device.

5. The method of claim 1, wherein each bit in the multi-bit network indication provides an indication of a corresponding one of the access technologies, the services, and the network capabilities.

6. The method of claim 1, further comprising:
  receiving the multi-bit network indication separately from an existing network indication.

7. The method of claim 1, further comprising:
  providing, via the user interface, information indicating a third portion of the access technologies, the services, and the network capabilities, wherein the third portion of the access technologies, the services, and the network capabilities comprises a selective portion of the first portion or the second portion of the access technologies, the services, and the network capabilities supported by the device.

8. A non-transitory computer-readable storage medium storing a set of instructions, the set of instructions comprising:
one or more instructions that, when executed by one or more processors of a device, cause the device to:
selectively pass bits of a multi-bit network indication to an upper layer of the device,
wherein a first portion of the bits of the multi-bit network indication are passed to the upper layer when the device is in a first network and indicate that a first portion of access technologies, services, and network capabilities indicated by the multi-bit network indication are accessible, and
wherein a second portion of the bits of the multi-bit network indication are passed to the upper layer when the device is in a second network and indicate that a second portion of the access technologies, services, and network capabilities indicated by the multi-bit network indication is accessible; and
receive, via the upper layer, a selection of one of the access technologies, the services, or the network capabilities provided via a user interface of the device based on selectively passing the first portion or the second portion of the bits of the multi-bit network indication,
wherein the one or more instructions, that cause the device to receive the selection of the one of the access technologies, the services, or the network capabilities, cause the device to receive the selection based on receiving user input via the user interface selecting the one of the access technologies, the services, or the network capabilities for usage on the device.

9. The non-transitory computer-readable storage medium of claim 8, wherein the one or more instructions further cause the device to:
provide, for display, information indicating that first portion or the second portion of the access technologies, services, and network capabilities.

10. The non-transitory computer-readable storage medium of claim 8, where the selection of the one of the access technologies is based on a performance of the device.

11. The non-transitory computer-readable storage medium of claim 8, wherein the one or more instructions further cause the device to:
provide a recommendation for the selection of the one of the access technologies based on a current usage of the device.

12. The non-transitory computer-readable storage medium of claim 8, wherein each bit in the multi-bit network indication provides an indication of a corresponding one of the access technologies, the services, and the network capabilities.

13. The non-transitory computer-readable storage medium of claim 8, wherein the one or more instructions further cause the device to:
receive the multi-bit network indication separately from an existing network indication.

14. The non-transitory computer-readable storage medium of claim 8, wherein the one or more instructions further cause the device to:
provide, via the user interface, information indicating a third portion of the access technologies, the services, and the network capabilities,
wherein the third portion of the access technologies, the services, and the network capabilities comprises a selective portion of the first portion or the second portion of the access technologies, the services, and the network capabilities supported by the device.

15. A device, comprising:
one or more processors configured to:
selectively pass bits of a multi-bit network indication to an upper layer of the device,
wherein a first portion of the bits of the multi-bit network indication are passed to the upper layer when the device is in a first network and indicate that a first portion of access technologies, services, and network capabilities indicated by the multi-bit network indication are accessible, and
wherein a second portion of the bits of the multi-bit network indication are passed to the upper layer when the device is in a second network and indicate that a second portion of the access technologies, services, and network capabilities indicated by the multi-bit network indication is accessible; and
receive, via the upper layer, a selection of one of the access technologies, the services, or the network capabilities provided via a user interface of the device based on selectively passing the first portion or the second portion of the bits of the multi-bit network indication,
wherein the one or more processors, to receive the selection of the one of the access technologies, the services, or the network capabilities, are configured to receive the selection based on receiving user input via the user interface selecting the one of the access technologies, the services, or the network capabilities for usage on the device.

16. The device of claim 15, wherein the one or more processors are further configured to:
provide, for display, information indicating that first portion or the second portion of the access technologies, services, and network capabilities.

17. The device of claim 15, where the selection of the one of the access technologies is based on a performance of the device.

18. The device of claim 15, wherein the one or more processors are further configured to:
provide a recommendation for the selection of the one of the access technologies based on a current usage of the device.

19. The device of claim 15, wherein each bit in the multi-bit network indication provides an indication of a corresponding one of the access technologies, the services, and the network capabilities.

20. The device of claim 15, wherein the one or more processors are further configured to:
receive the multi-bit network indication separately from an existing network indication.

* * * * *